United States Patent Office 3,472,848
Patented Oct. 14, 1969

3,472,848
3-HYDROXY AND 3-MERCAPTO-PYRAZINOYL-
GUANIDINES, CORRESPONDING ETHERS
AND THIOETHERS AND PROCESSES FOR
THEIR PREPARATION
Edward J. Cragoe, Jr., Lansdale, and James H. Jones,
Blue Bell, Pa., assignors to Merck & Co. Inc., Rahway,
N.J., a corporation of New Jersey
No Drawing. Filed Nov. 17, 1966, Ser. No. 594,996
Int. Cl. C07d 51/76; A61k 27/00
U.S. Cl. 260—250                          19 Claims

ABSTRACT OF THE DISCLOSURE 3-hydroxy- and 3-mercapto-pyrazinoylguanidines and corresponding ethers and thioethers are described. These compounds are prepared either by treatment of the corresponding ester or related compound with a guanidine which may or may not carry substituents, or in the case of 3-hydroxy compounds, by diazotiazation of a 3-amino-pyrazinoylguanidine. The products have utility as diuretic agents in the treatment of disorders conducive to diuretic and/or saluretic therapy.

---

This invention relates to pyrazinoyl compounds which can be represented by the following structural formula

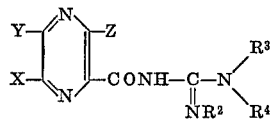

and pharmaceutically acceptable acid addition salts thereof, especially the hydrochloride salts, wherein:

X represents
  (b) halo such as chloro, bromo and iodo,
  (c) loweralkyl of from 1 to 5 carbon atoms,
  (d) lower cycloalkyl of from 3 to 6 carbon atoms, and
  (e) mononuclear aryl, especially phenyl either unsubstituted or substituted preferably with halogen such as chloro or bromo;

Y represents
  (a) hydrogen,
  (b) hydroxy,
  (c) lower-alkoxy of from 1 to about 5 carbon atoms,
  (d) lower-alkylthio of from 1 to about 3 carbon atoms,
  (e) loweralkyl of from 1 to about 5 carbon atoms,
  (f) ω,ω,ω-trifluorolower-alkyl such as trifluoromethyl, trifluoroethyl and the like,
  (g) lower-cycloalkyl having 3 to 6 carbons,
  (h) mononuclear-aryl, preferably phenyl, and
  (i)

wherein $R^5$ represents
  (1) hydrogen, and
  (2) loweralkyl or from 1 to about 5 carbon atoms;
$R^6$ represents
  (1) hydrogen,
  (2) loweralkyl ether straight or branched chain of from 1 to 6 carbon atoms, and
  (3) substituted lower alkyl (having 1–6 carbons) containing one or more substituents such as
    (a) hydroxyl,
    (b) alkoxy, preferably having up to 3 carbon atoms
    (c) trifluoromethyl,
    (d) cycloalkyl having from 3 to 6 carbons, and
    (e) mononuclear aryl, preferably phenyl, unsubstituted or substituted such as with
      (1) lower alkyl,
      (2) halo, such as chloro, bromo, iodo, fluoro and
    (f) heterocyclic substituted especially a 5 or 6 membered oxygen or nitrogen containing heterocycle as furyl, pyridyl,
  (4) lower alkenyl of from 2 to about 5 carbons,
  (5) lower alkynyl of from 3 to about 5 carbons,
  (6) lower cycloalkyl of from 3 to 6 carbons,
  (7) aryl, especially phenyl,
  (8) when $R^5$ and $R^6$ each represents lower alkyl, they can be linked together to form a cyclic structure with the nitrogen atom to which they are attached, particularly a 5- to 8- membered ring, advantageously such as 1-pyrrolidinyl, piperidino, hexahydro-1-azepinyl, octahydro-1-azocinyl and the like, and
  (9) when $R^5$ and $R^6$ each represents lower alkyl, they can be linked together through another nitrogen atom to form a cyclic structure with the nitrogen atom to which they are attached, such as 1-loweralkyl-4-piperazinyl;

X and Y can be linked together to form a 4-membered carbon chain either unsaturated or saturated, either unsubstituted or substituted with, for example, a halogen to form compounds such as tetrahydroquinoxaline or quinoxaline derivatives;

$R^2$ represents
  (a) hydrogen,
  (b) lower alkyl of from 1 to 5 carbon atoms;
$R^3$ represents
  (a) hydrogen,
  (b) loweralkyl of from 1 to about 5 carbon atoms;
$R^4$ represents
  (a) hydrogen,
  (b) loweralkyl of from 1 to about 5 carbon atoms,
  (c) substituted lower alkyl with substituents such as
    (1) aryl, especially phenyl,
    (2) substituted phenyl, such as with halogen, such as chloro or fluoro, loweralkyl or loweralkoxy, each having from 1 to 3 carbon atoms,
    (3) heterocyclic substituents such as octahydro-1-azocinyl, hexahydro-1-azepinyl and pyridyl,
    (4) hydroxyl, (d) mononuclear aryl, especially phenyl, either unsubstituted or substituted such as with
  (1) loweralkyl having from 1 to 3 carbons,
  (2) loweralkoxy having from 1 to 3 carbons,
  (3) halo, particularly chloro or fluoro;
$R^3$ and $R^4$ also can be lower alkyl groups linked together either directly or through another hetero atom to produce a 5- to 8-membered ring, thus forming with the nitrogen atom to which they are attached radicals such as 1-pyrrolidinyl, piperidino, morpholino, and the like;
$R^2$ and $R^3$ also can be lower alkyl groups linked together to form a cyclic structure with the nitrogen atoms to which they are attached, particularly to form a 2-imidazolinyl group or a 3, 4, 5, 6-tetrahydro-2-pyrimidinyl group;

Z represents
  (a) $OR^7$ wherein $R^7$ represents
    (1) hydrogen,
    (2) loweralkyl of from 1 to 5 carbon atoms,
    (3) phenyl-lower alkyl, and
  (b) $SR^8$ wherein $R^8$ represents
    (1) hydrogen,
    (2) loweralkyl of from 1 to 5 carbon atoms,
    (3) aralkyl, such as benzyl and phenethyl, and
    (4) aryl, preferably phenyl.

The pyrazinoylguanidine compounds of this invention are useful diuretic and saluretic agents in the treatment of edema, hypertension and other diseases known to be responsive to diuretic therapy.

The compounds of this invention are made by one of the two following methods in which the radicals X, Y, Z, $R^2$, $R^3$ and $R^4$ are as defined above:

Method A

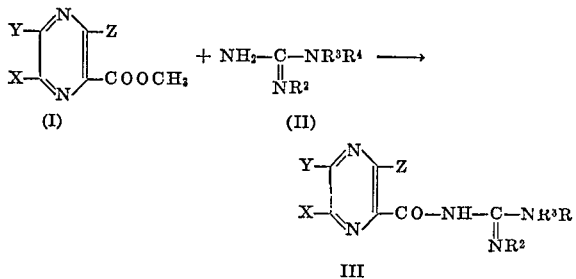

Synthesis by Method A involves the reaction of a pyrazinoic acid ester of the type illustrated by Compound I with a guanidine of the type illustrated by Compound II. The methyl ester is shown for illustrative purposes only since the ester may be that of certain other alcohols, especially lower aliphatic alcohols, advantageously lower alkanols. It will be noted that this alkoxy (ester) radical does not appear in the desired end product.

The above synthesis is preferably carried out under anhydrous conditions either with or without a solvent such as methanol, ethanol, isopropyl alcohol or other solvents. The reaction can be carried out at room temperature or by heating on a steam bath for 1 minute to 2 hours or longer. The desired product usually is recovered from the cooled reaction mixture by trituration with water. Purification frequently is carried out by converting the product to a salt which can be recrystallized, or the base can be regenerated by addition of aqueous alkali.

Method B

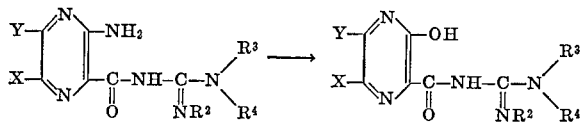

wherein X, Y, $R^2$, $R^3$ and $R^4$ are as defined above.

This method is applicable to the preparation of the 3-hydroxy pyrazinoylguanidines. Surprisingly it has been found that diazotization does not effect the guanidine group nor an amino group in the 5-position, i.e., when Y represents amino. It involves the reaction of an aqueous solution of an acid addition salt of a 3-aminopyrazinoylguanidine with nitrous acid. In general, it is advantageous to suspend the 3-aminopyrazinoylguanidine compound in water and dissolve it by the addition of two equivalents of an acid. It is preferable to choose an acid that forms a water soluble salt, i.e., methanesulfonic acid. The solution is cooled to the range of 0° C. to 10° C. and treated with an alkali metal nitrite such as sodium or potassium nitrite and after the diazotization is complete the solution is heated to a temperature of 50° C. to 80° C.

The 3-aminopyrazinoylguanidine compounds used as starting materials in Method B are prepared by the reaction of an alkyl 3-aminopyrazinoate with a guanidine, or by the reaction of a pyrazine[1,4][1,3]oxazin-4-one with a guanidine followed by hydrolysis of the (3-acylaminopyrazinoyl)guanidine.

The method of preparation of the various 3-Z-pyrazinoic acid esters employed as starting materials in Method A described above are dependent on the nature of the 3-Z-substituent and are described below.

(1) Alkyl 3-hydroxy-5-Y-6-X-pyrazinoates.—The alkyl 3-hydroxypyrazinoate compounds are prepared by treating a cooled solution of the corresponding alkyl 3-aminopyrazinoate in concentrated sulfuric acid or methanesulfonic acid with a cooled concentrated acid solution of an alkali metal nitrite such as sodium or potassium nitrite. After the addition of the nitrite is complete, the reaction mixture is stirred at 0° C. to 10° C. for about 15 minutes to 2 hours, and then poured onto crushed ice. The product is recovered by extracting the reaction mixture with a solvent, and extracting the organic phase with an aqueous base, which on acidification precipitates the alkyl 3-hydroxypyrazinoate compound which is purified by recrystallization.

In many cases, particularly wherein the molecule carries a 5-substituent, the desired product precipitates directly on pouring the reaction mixture onto crushed ice. Thus the product is isolated by filtration, washing with water, drying and recrystallizing.

(2) Alkyl 3-alkoxy-5-Y-6-X-pyrazinoates.—(a) The alkyl 3-lower-alkoxypyrazinoate compounds are obtained by preparing a cold solution of an alkyl 3-aminopyrazinoate in an acid such as concentrated sulfuric acid, methanesulfonic acid or the like, in slowly adding thereto a solution of an alkali nitrite in cold, concentrated acid. After the addition is complete, the mixture is stirred at 0° C.–10° C. for one hour and then slowly poured with stirring into an excess of a lower alkanol; the reaction mixture then is refluxed for 1 to 3 hours. The product can be recovered by extracting the reaction mixture with a solvent and removing the solvent by distillation. The residue is purified by recrystallization. By the same procedure there is produced 3-(phenyl-loweralkoxy) compounds for example, 3-benzyloxy. (b) Another method for preparing alkyl 3-alkoxypyrazinoate compounds is from the corresponding alkyl 3-bromopyrazinoate compounds by reaction with the sodium salt of an alkanol.

(3) Alkyl 3-bromo-5-Y-6-X-pyrazinoates.—The alkyl 3-bromopyrazinoates employed in 2(b) and in parts 4 and 5 which follow can be prepared by treating a suspension of an alkyl 3-aminopyrazinoate in a mixture of bromine, hydrobromic acid and acetic acid at a temperature of 0° C.–10° C. with an aqueous solution of an alkali nitrite. Stirring is continued at a temperature below 0° C. for about ½–2 hours, after which time the excess bromine is destroyed, suitably by the addition of an alkali bisulfite. The product usually is recovered by filtration and purified by recrystallization.

(4) Alkyl 3-mercapto-5-Y-6-X-pyrazinoates.—The alkyl 3-mercaptopyrazinoate compounds are prepared by heating a suspension of the corresponding alkyl 3-bromopyrazinoate, sodium sulfide and sulfur in an alcoholic solution. The product can be recovered, for example, by distilling off the solvent, adding water, acidifying, and filtering off the precipitated product. The product can be purified by dissolving in dilute aqueous alkali and reprecipitating with acid.

(5) Alkyl 3-substituted thio-5-Y-6-X-pyrazinoates.—The 3-alkylthio-, 3-aralkylthio-, and 3-arylthiopyrazinoate esters are prepared by the reaction of an alkyl 3-bromopyrazinoate with the alkali metal salts of an alkyl mercaptan, an aralkyl mercaptan or an aryl mercaptan, respectively. Conveniently, the alkyl 3-bromopyrazinoate is added to an aqueous alcoholic solution of the appropriate mercaptan at room temperature with rapid stirring; stirring then is continued for ½ to 3 hours.

The intermediate alkyl 3-aminopyrazinoates and substituted guanidines are prepared by the methods described in Belgian Patent No. 498,330, published on Oct. 11, 1962, and Belgian Patents Nos. 639,386 and 639,393, both published on Apr. 30, 1964, the disclosures of which are included herein by reference.

In some instances, it may be desirable to make a pharmaceutically acceptable acid salt of these compounds by reacting the free base with an acid such as hydrochloric, hydrobromic, phosphoric, sulfuric, maleic, tartaric, salicyclic, citric and the like. These salts are to be considered as included in this invention and also included within the scope of the claims.

The products of this invention can be administered to man or animals in the form of pills, tablets, capsules, elixirs, injectable preparations and the like and can comprise one or more of the compounds of this invention as the only essential active ingredient of the pharmaceutical formulation, or as mentioned above, the novel compound(s) can be combined in pharmaceutical formulations with other diuretic agents or, indeed, other therapeutic agents.

The compounds of this invention are advantageously administered at a dosage range of from about 5 mg. to about 750 mg. or at a somewhat higher or lower dosage at the physician's discretion, preferably on a 2 to 4 times a day regimen.

The following examples are illustrative of the methods by which the products of this invention can be prepared. All melting points recited therein are corrected values.

EXAMPLE 1

Methyl 3-hydroxy-6-bromopyrazinoate

Keeping the temperature at 25° C., methyl 3-amino-6-bromopyrazinoate (4.6 g., 0.02 mole) is dissolved in concentrated sulfuric acid (15 ml.). The solution is stirred and cooled to 0° C.; then a solution of sodium nitrite (1.6 g., 0.02 mole), dissolved in cold concentrated sulfuric acid (15 ml.), is added slowly. After addition is complete, the mixture is stirred at 0–5° C. for 30 minutes and then poured, with stirring, into crushed ice. The resulting solution is extracted with chloroform using three 200 ml. portions. The combined chloroform extracts are extracted with a sodium hydroxide solution (25 ml. of 2.5 N solution). Upon acidification of the aqueous solution, 2.6 g. (53%) of methyl 3-hydroxy-6-bromopyrazinoate separates. Recrystallization from hexane gives material that melts at 120.5–121.5° C.

*Analysis.*—Calculated for $C_6H_5BrN_2O_3$: C, 30.92; H, 2.16; N, 12.02. Found: C, 31.24; H, 2.45; N, 11.94.

EXAMPLE 2

Methyl 3-hydroxy-5-ethylamino-6-chloropyrazinoate

To a stirred solution of methyl 3-amino-5-ethylamino-6-chloropyrazinoate (23.0 g., 0.1 m.) in concentrated sulfuric acid (75 ml.) maintained at 5–10° C. is added a cold solution of sodium nitrite (6.9 g., 0.1 m.) in concentrated sulfuric acid (75 ml.). The reaction is stirred for 1.5 hours without cooling and then poured into ice (1000 g.) which causes a pale yellow solid to precipitate. The precipitate is recovered by filtration and dried to yield 17.2 g. (75%) of product melting at 180–184° C. The pure product is obtained by crystallization from an ethanol-water (1:1) mixture and has a melting point of 182–184° C.

*Analysis.*—Calculated for $C_8H_{10}N_3O_3Cl$: C, 41.48; H, 4.35; N, 18.14. Found: C, 41.06; H, 4.46; N, 17.96.

EXAMPLE 3

Methyl 3-hydroxy-5-dimethylamino-6-chloropyrazinoate

Methyl 3-amino-5-dimethylamino-6-chloropyrazinoate (4.6 g., 0.02 mole) is added to 8 ml. of concentrated hydrochloric acid, and the mixture is cooled to 3° C. A solution of 1.5 g. (0.022 mole) of sodium nitrite in 10 ml. of water is added during 30 minutes while the reaction mixture is maintained at 3–5° C. The mixture is allowed to warm to room temperature during 45 minutes. The solid product is collected and dissolved in 40 ml. of 5% sodium hydroxide solution. The solution then is filtered and acidified to obtain 1.6 g. of product, M.P. 137–140° C. Recrystallization from methanol gives 0.9 g. of methyl 3-hydroxy-5-dimethylamino-6-chloropyrazinoate, M.P. 140.5–141.5° C.

*Analysis.*—Calculated for $C_8H_{10}ClN_3O_3$: N, 18.14. Found: N, 18.12.

Following substantially the procedures described in Examples 1, 2 and 3 but employing an equimolecular quantity of the appropriate methyl 3-amino-5-Y-6-X-pyrazinoates as starting materials there is obtained the corresponding methyl 3-hydroxy-5-Y-6-X-pyrazinoates depicted in Table I.

TABLE I $$\begin{array}{c} Y-\underset{X-}{\overset{N}{\bigcirc}}-NH_2 \\ -COOCH_3 \end{array} \xrightarrow[\text{② } H_2O]{\text{① } NaNO_2/H+} \begin{array}{c} Y-\underset{X-}{\overset{N}{\bigcirc}}-OH \\ -COOCH_3 \end{array}$$

| Example | X | Y |
|---|---|---|
| 4 | I | H |
| 5 | Cl | CH₂=CHCH₂NH— |
| 6 | Cl | ⟨phenyl⟩—CH₂NH— |
| 7 | | ⟨cyclohexyl⟩ |
| 8 | Cl | CH₃CH₂CH₂NH— |
| 9 | Cl | CH₃OCH₂CH₂NH— |
| 10 | Cl | ⟨cyclopentyl⟩—NH— |
| 11 | Cl | CH₃S— |
| 12 | Cl | NH₂ |

EXAMPLE 13

Methyl 3-methoxy-6-chloropyrazinoate

Methyl 3-amino-6-chloropyrazinoate (18.7 g., 0.1 mole) is added slowly to a stirred solution of concentrated sulfuric acid (75 ml.) at 0° C.–5° C. A solution of sodium nitrite (9 g., 0.13 mole) in concentrated sulfuric acid (75 ml.) at 10° C. is added slowly with vigorous mechanical stirring. After the addition is complete, the mixture is stirred at 5° C.–10° C. for one hour and then slowly poured with stirring into methanol (1500 ml.). The solution is refluxed for 1½ hours, concentrated by evaporation under vacuum to a volume of 500 ml. and then poured onto crushed ice (1500 g.). The solution is extracted with chloroform (750 ml.) and the chloroform extract dried over anhydrous sodium sulfate. The solvent is removed by distillation under vacuum. The residual yellow oil is dissolved in hot ethanol (50 ml.), cooled, and water gradually added until the product separates. The yield of methyl 3-methoxy-6-chloropyrazinoate is 2.6 g. (13%), M.P. 45° C. This material may be purified, but is normally used without further purification in the preparation of the pyrazinoylguanidine.

Following substantially the procedure described in Example 13, but employing an equimolecular quantity of the appropriate methyl 3-amino-5-Y-6-X-pyrazinoates as starting materials, diazotizing and then decomposing the diazonium salt with an alcohol having the formula $R^7OH$ in place of the methanol used in Example 13, there is obtained the corresponding methyl 3-alkoxy-5-Y-6-X-pyrazinoates in Table II.

TABLE II

| Example | X | Y | R⁷ |
|---|---|---|---|
| 14 | H | CH₃ | CH₃— |
| 15 | C₂H₅ | H | CH₃— |
| 16 | H | CF₃ | C₂H₅— |
| 17 | H | OH | CH₃CH₂CH₂— |
| 18 | H | OCH₃ | n-C₄H₉— |
| 19 | Cl | —NH—CH(CH₃)CH₂CH₃ | CH₃— |
| 20 | Cl | 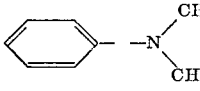 | n-C₅H₁₁— |
| 21 | Cl | —SCH₃ | CH₃ |
| 22 | 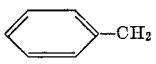 | —N(CH₃)₂ | CH₃— |
| 23 | Cl | CH₃ | 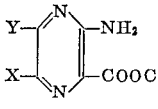 |

EXAMPLE 24

Methyl 3-bromo-6-chloropyrazinoate

Methyl 3-amino-6-chloropyrazinoate is suspended in a mixture of 48% hydrobromic acid (114 ml.) and acetic acid (40 ml.). The mixture is cooled to 0° C., stirred and treated, dropwise, over 45 minutes with a solution of bromine (15 ml.) in acetic acid (30 ml.). Then a solution of sodium nitrite (17.4 g.) in water (30 ml.) is added, keeping the temperature below 0° C. Stirring is continued for 30 minutes after the addition is complete and the excess bromine then is destroyed by the dropwise addition of a 30% aqueous sodium bisulfite solution (150 ml.). The product which separates is removed by filtration, washed with cold water and dried. The yield of methyl 3-bromo-6-chloropyrazinoate is 14.2 g. (56%), M.P. 35–36° C. Recrystallization from water gives material with the same melting point.

*Analysis.*—Calculated for C₆H₄N₂O₂BrCl: C, 28.66; H, 1.60; N, 11.14. Found: C, 28.53; H, 1.67; N, 10.83.

Employing substantially the same procedure described in Example 24, but substituting for methyl 3-amino-6-chloropyrazinoate as starting material an equimolecular quantity of the appropriate methyl 3-amino-5-Y-6-X-pyrazinoate identified in Table III there is obtained the methyl 3-bromo-5-Y-6-X-pyrazinoates having the values of Y and X as depicted in Table III.

TABLE III

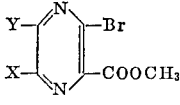

| Example | X | Y |
|---|---|---|
| 25 | Br | H |
| 26 | 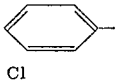 | H |
| 27 | Cl | C₂H₅NH— |
| 28 | Br |  |
| 29 | CH₃ | CH₃ |
| 30 | H |  |
| 31 |  | H |
| 32 | H |  |
| 33 |  | H |
| 34 | H | (CH₃)₂CHNH— |
| 35 | Cl | n-C₆H₁₃NH |
| 36 | Cl |  |
| 37 | Cl |  |

EXAMPLE 38

Methyl 3-mercapto-6-chloropyrazinoate

A suspension of sodium sulfide (4.8 g., 0.02 mole) and sulfur (5.9 g., 0.156 g. atoms) in ethanol (40 ml.) is refluxed for 30 minutes. Methyl 3-bromo-6-chloropyrazinoate from Example 24 (5.0 g., 0.02 mole) is added to the solution, and the mixture is refluxed for 30 minutes. The solution is evaporated under vacuum to a volume of 20 ml. Water (60 ml.) is added and the mixture is acidified with dilute hydrochloric acid. The product that separates is removed by filtration, dissolved in dilute sodium hydroxide, filtered and then acidified with dilute hydrochloric acid. The methyl 3-mercapto-6-chloropyrazinoate that separates is removed by filtration, washed with water, and dried. The yield is 3.5 g. (87%), M.P. 80° C. This material is sufficiently pure for use in the preparation of the corresponding pyrazinoylguanidine.

EXAMPLE 39

Methyl 3-mercaptopyrazinoate

A suspension of sodium sulfide (9.0 g., 0.0375 mole) and sulfur (2.4 g., 0.075 g. atoms) in methanol (100 ml.) is refluxed for 30 minutes. Methyl 3-bromopyrazinoate (8 g., 0.037 mole) is added to the resulting solution and the mixture is refluxed for 30 minutes. The solution is evaporated under vacuum to a volume of 30 ml.; then water (100 ml.) is added and the mixture is acidified with hydrochloric acid. The bright red product that separates is removed by filtration, dissolved in dilute sodium hydroxide, filtered, and acidified with dilute hydrochloric acid. The methyl 3-mercaptopyrazinoate is removed by filtration, washed with water and dried. The yield is 3 g. (48%), M.P. 124–125° C. (dec.). This material is sufficiently pure for use in the preparation of the corresponding pyrazinoylguanidine.

EXAMPLE 40

Methyl 3-mercapto-5-phenyl-6-bromopyrazinoate

Employing essentially the same procedure as described in Example 38 but substituting an equimolar amount of methyl 3,6-dibromo-5-phenylpyrazinoate prepared in Example 28 for methyl 3-bromo-6-chloropyrazinoate there is produced the corresponding methyl 3-mercapto-5-phenyl-6-bromopyrazinoate.

EXAMPLE 41

Methyl 3-mercapto-5-ethylamino-6-chloropyrazinoate

Following substantially the same procedure as shown in Example 39, except using methyl 3-bromo-5-ethylamino-6-chloropyrazinoate (from Example 27) in place of methyl 3-bromopyrazinoate there is produced methyl 3-mercapto-5-ethylamino-6-chloropyrazinoate. The compound is recrystallized from hexane and has a melting point of 136-138° C. when pure.

Analysis.—Calculated for $C_8H_{10}N_3O_2ClS$: C, 38.79; H, 4.07; N, 16.96. Found: C, 38.77; H, 4.11; N, 16.89.

EXAMPLE 42

Methyl 3-methylmercapto-6-bromopyrazinoate

A solution of methanol (75 ml.) and 20% sodium hydroxide (5.3 ml., 0.026 mole) is stirred, and gaseous methyl mercaptan is admitted below the surface until 1.28 g. (0.0265 mole) has been absorbed. The solution is stirred rapidly and methyl 3,6-dibromopyrazinoate, from Example 25, (7.8 g., 0.026 mole) is added as rapidly as possible. Stirring is continued for 30 minutes after the addition is complete. During this time a solid begins to separate. Water (100 ml.) is added and the precipitated methyl 3-methyl-mercapto-6-bromopyrazinoate is removed by filtration and dried. The yield is 5.6 g. (80%), M.P. 127-130° C. Recrystallization from ethanol gives material having a melting point of 136-137° C.

Analysis.—Calculated for $C_7H_7BrN_2O_2S$: C, 31.95; H, 2.70; N, 10.64. Found: C, 32.36; H, 2.70; N, 11.34.

Employing essentially the same procedure as described in Example 42 but substituting for methyl 3,6-dibromopyrazinoate and methyl mercaptan equimolecular quantities of the appropriate methyl 3-bromo-5-Y-6-X-pyrazinoate identified in Table IV and the mercaptan designated $R^8SH$, there is obtained the corresponding methyl 3-$SR^8$-5-Y-6-X-pyrazinoates identified in Table IV.

TABLE IV

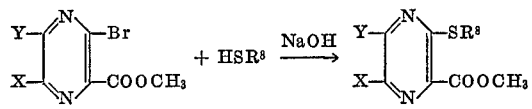

| Example | Starting Material Prepared in Example | X | Y | R⁸ |
|---|---|---|---|---|
| 43 | 29 | CH₃ | CH₃ | C₂H₅ |
| 44 | 30 | H | ⬡- | n-C₄H₉— |
| 45 | 31 | ▷- | H | n-C₅H₁₁— |
| 46 | 32 | H | ⬡- | ⬡- |
| 47 | 33 | Cl-⬡ | H | ⬡-CH₂— |
| 48 | 34 | H | CH₃\CHNH/CH₃ | ⬡-CH₂CH₂— |
| 49 | 35 | Cl | n-C₆H₁₃NH— | ⬡-CH₂— |
| 50 | 36 | Cl | ▯-NH | CH₃ |
| 51 | 37 | Cl | CH₃-N⟨⟩N | CH₃ |
| 52 | 26 | ⬡ | H | ⬡- |

EXAMPLE 53

(3-hydroxy-6-bromopyrazinoyl)guanidine hydrochloride

Sodium (230 mg., 0.01 mole) is dissolved in dry ethanol (40 ml.) under anhydrous conditions. The solution is cooled, and dry pulverized guanidine hydrochloride (950 mg., 0.01 mole) is added. The mixture is stirred mechanically and refluxed for 30 minutes. After cooling and removing the precipitated sodium chloride by filtration, the filtrate is treated with methyl 3-hydroxy-6-bromopyrazinoate (2.0 g., 0.0086 mole) prepared in Example 1. The solution then is stirred for one hour at room temperature. Water (80 ml.) is added and the solution is acidified with acetic acid. The solid that separates is removed by filtration and dried; the yield is 1.7 g. (75%), M.P. 215° C. (dec.). The product is dissolved in hot 3 N hydrochloric acid, filtered and cooled. The (3-hydroxy-6-bromopyrazinoyl)guanidine hydrochloride that separates as yellow needles is recrystalized from a 1:1 water-alcohol mixture. This material does not melt below 290° C.

*Analysis.*—Calculated for $C_6H_7BrClN_5O_2$: C, 24.30; H, 2.38; N, 23.61. Found: C, 24.57; H, 2.50; N, 23.88.

EXAMPLE 54

(3-hydroxy-5-dimethylamino-6-chloropyrazinoyl)-guanidine hydrochloride

Guanidine hydrochloride (5.0 g., 0.052 mole) is added to a solution of 1.0 g. (0.045 g. atom) of sodium in 30 ml. of 2-propanol. Methyl 3-hydroxy-5-dimethylamino-6-chloropyrazinoate (2.1 g., 0.009 mole) prepared in Example 3, is added and the mixture is heated for one hour on the steam bath. The mixture is poured into 50 ml. of 5% hydrochloric acid. The solution is filtered, and 20 ml. of concentrated hydrochloric acid is added to precipitate the hydrochloric acid salt of the product. The salt is recrystallized from a 1% solution of hydrochloric acid to obtain 0.6 g. of (3-hydroxy-5-dimethylamino-6-chloropyrazinoyl)guanidine hydrochloride, M.P. 228–230° C. (dec.).

*Analysis.*—Calculated for $C_8H_{11}ClN_6O_2 \cdot HCl$: C, 32.55; H, 4.10; N, 28.48. Found: C, 32.80; H, 4.32; N, 28.33.

EXAMPLE 55

(3-methoxy-6-chloropyrazinoyl)guanidine hydrochloride

Sodium (920 mg., 0.04 mole) is dissolved in dry methanol (50 ml.) under anhydrous conditions. The solution is cooled and dry pulverized guanidine hydrochloride (4.0 g., 0.042 mole) is added. The mixture then is stirred mechanically and refluxed for 30 minutes. After cooling and removing the precipitated sodium chloride by filtration, the filtrate is treated with methyl 3-methoxy-6-chloropyrazinoate (2.6 g., 0.0128 mole) prepared in Example 13. The mixture is stirred for an hour at room temperature and the yellow solid that separates is removed by filtration. The solid is dissolved in hot 3 N hydrochloric acid, filtered and cooled. The (3-methoxy-6-chloropyrazinoyl)guanidine hydrochloride that separates weighs 1.6 g. (47%), M.P. 214–216° C. (dec.).

*Analysis.*—Calculated for $C_7H_9Cl_2N_5O_2$: C, 31.59; H, 3.33; N, 26.32. Found: C, 31.73; H, 3.59; N, 26.27

EXAMPLE 56

(3-mercapto-6-chloropyrazinoyl)guanidine hemihydrate

Sodium (920 mg., 0.04 mole) is dissolved in dry methanol (50 ml.) under anhydrous conditions. The solution is cooled, and dry pulverized guanidine hydrochloride (4.0 g., 0.042 mole) is added. The mixture is stirred mechanically and refluxed for 30 minutes. After cooling, and removing the sodium chloride by filtration, the filtrate is treated with methyl 3-mercapto-6-chloropyrazinoate (3.5 g., 0.017 mole) prepared in Example 38. The mixture then is stirred at room temperature for 1½ hours. Water (75 ml.) is added, the solution filtered and the filtrate is neutralized with dilute acetic acid. The (3-mercapto-6-chloropyrazinoyl)guanidine hemihydrate that separates is removed by filtration and dried. The yield is 2.5 g. (55%), M.P. 258–260° C. (dec.). The solid is suspended in water and dissolved by the addition of dilute hydrochloric acid; after filtering the product is precipitated by neutralization of the solution with dilute sodium hydroxide. The melting point of the product is unchanged.

*Analysis.*—Calculated for $(C_6H_6ClN_5S)_2 \cdot H_2O$: C, 29.94; H, 2.93; N, 29.10. Found: C, 29.99; H, 2.94; N, 28.88.

EXAMPLE 57

(3-methylmercapto-6-bromopyrazinoyl) guanidine hydrochloride

Sodium (920 mg., 0.04 mole) is dissolved in methanol (100 ml.) under anhydrous conditions. The solution is cooled and dry pulverized guanidine hydrochloride (3.8 g., 0.04 mole) is added. The mixture is stirred mechanically and refluxed for 30 minutes. After cooling and removing the sodium chloride by filtration, the filtrate is treated with methyl 3-methylmercapto-6-bromopyrazinoate (3.3 g., 0.0135 mole) prepared in Example 42 and the mixture is heated briefly to effect solution. The reaction mixture is stirred at room temperature for 30 minutes, and the product which separates is removed by filtration. The solid is dissolved in hot 3 N hydrochloric acid, filtered and cooled. The (3-methylmercapto-6-bromopyrazinoyl)guanidine hydrochloride that separates weighs 2.4 g. (55%), M.P. 271.5–276.5° C. (dec.). Recrystallization from water containing a small quantity of hydrochloric acid gives material melting at 276.5–279.5° C. (dec.).

*Analysis.*—Calculated for $C_7H_9BrClN_5OS$: C, 25.74; H, 2.78; N, 21.44; S, 9.81. Found: C, 25.85; H, 2.85; N, 21.33; S, 9.70.

By employing substantially the procedures described in Examples 53 to 57 inclusive starting with the methyl 3-Z-5-Y-6-X-pyrazinoate and a guanidine salt of structure

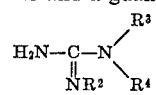

each of which is identified in the following table, there is produced the corresponding 1-(3-Z-5-Y-6-X-pyrazinoyl)-2-$R^2$-3-$R^3$-3-$R^4$-guanidines described in Table V.

TABLE V

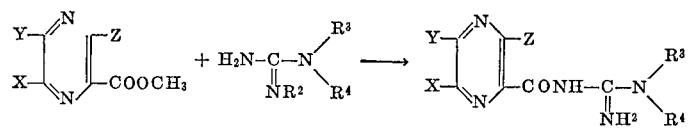

| Ex. | Source of Starting Material | X | Y | Z | $R^2$ | $R^3$ | $R^4$ |
|---|---|---|---|---|---|---|---|
| 58 | 41 | Cl | $C_2H_5NH$ | SH | H | H | H |
| 59 | 14 | H | $CH_3$ | $OCH_3$ | H | H | $-CH_2CH_2OH$ |
| 60 | 15 | $C_2H_5$ | H | $OCH_3$ | H | H | H |
| 61 | 15 | $C_2H_5$ | H | $OCH_3$ | H | H | $-CH_2CH_2-N\underset{(CH_2)_7}{\underbrace{\quad\quad}}$ |
| 62 | 39 | H | H | SH | H | H | H |
| 63 | 52 | $C_6H_5$– | H | $S-C_6H_5$ | H | H | H |
| 64 | 3 | Cl | $(CH_3)_2N-$ | OH | $CH_3$ | H | $CH_3$ |

TABLE V—Continued

| Ex. | Source of Starting Material | X | Y | Z | R² | R³ | R⁴ |
|---|---|---|---|---|---|---|---|
| 65 | 1 | Br | H | OH | H | H | —C₆H₅ |
| 66 | 13 | Cl | H | OCH₃ | H | H | —CH₂—C₆H₅ |
| 67 | 14 | H | CH₃ | OCH₃ | H | CH₃ | CH₃ |
| 68 | 38 | Cl | H | SH | H | C₂H₅ | C₂H₅ |
| 69 | 38 | Cl | H | SH | H | n-C₄H₉ | n-C₄H₉ |
| 70 | 42 | Br | H | SCH₃ | CH₃ | H | CH₃ |
| 71 | 4 | I | H | OH | H | H | —C₆H₄—Cl |
| 72 | 16 | H | —CF₃ | OC₂H₅ | H | H | —CH₂CH₂—C₆H₅ |
| 73 | 17 | H | OH | n-C₃H₇O | H | H | —CH(CH₃)— |
| 74 | 18 | H | OCH₃ | n-C₄H₉O | H | H | —(CH₂)₄— |
| 75 | 43 | CH₃ | CH₃ | C₂H₅S— | H | H | —CH₂—C₆H₄—F |
| 76 | 44 | H | C₆H₁₁— | n-C₄H₉S | H | H | —CH₂—C₆H₄—CH₃ |
| 77 | 45 | cyclopropyl | H | n-C₅H₁₁S | H | H | —CH₂—C₆H₄—OCH₃ |
| 78 | 46 | H | C₆H₅ | C₆H₅—S | H | H | 1-methylnaphthyl |
| 79 | 47 | Cl—C₆H₄— | H | C₆H₅—CH₂S | H | H | —CH₂-pyridyl |
| 80 | 48 | H | (CH₃)₂CHNH— | C₆H₅—CH₂CH₂S | —(CH₂)₂— | | H |
| 81 | 5 | Cl | CH₂=CH—CH₂NH— | OH | —(CH₂)₃— | | H |
| 82 | 19 | Cl | CH₃CH₂CH(CH₃)—NH— | OCH₃ | H | CH₃ | CH₃ |
| 83 | 49 | Cl | n-C₆H₁₃NH— | C₆H₅—CH₂S | H | n-C₄H₉ | n-C₄H₉ |
| 84 | 50 | Cl | cyclopentyl-NH— | CH₃S | H | CH₃ | —CH₂—C₆H₅ |
| 85 | 6 | Cl | C₆H₅—CH₂NH— | OH | H | | —(CH₂)₄— |
| 86 | 51 | Cl | CH₃N(piperazinyl)N— | SCH₃ | H | H | —CH₂—C₆H₃(CH₃)₂ |
| 87 | 20 | Cl | pyrrolidinyl-N— | n-C₅H₁₁O | H | H | —CH₂—C₆H₃Cl₂ |
| 88 | 7 | cyclohexyl | | OH | H | H | H |
| 89 | 21 | Cl | CH₃S | OCH₃ | H | H | —CH₂CH₂—C₆H₅ |
| 90 | 22 | C₆H₅— | N(CH₃)₂ | OCH₃ | H | H | H |

TABLE V—Continued

| Ex. | Source of Starting Material | X | Y | Z | R² | R³ | R⁴ |
|---|---|---|---|---|---|---|---|
| 91 | 2 | Cl | C₂H₅NH— | OH | H | H | H |
| 92 | 8 | Cl | n-C₃H₇NH | OH | H | H | H |
| 93 | 9 | Cl | CH₃O(CH₂)₂NH— | OH | H | CH₃ | CH₃ |
| 94 | 10 | Cl | ⌬—NH | OH | H | H | H |
| 95 | 11 | Cl | CH₃S | OH | H | H | —CH(CH₃)—C₆H₅ |
| 96 | 12 | Cl | NH₂ | OH | H | H | H |
| 97 | 23 | Cl | CH₃ | C₆H₅—CH₂O | H | H | H |

EXAMPLE 98

(3-hydroxy-6-chloropyrazinoyl)guanidine (3-amino-6-chloropyrazinoyl)guanidine (6.42 g., 0.03 mole) is suspended in water (300 ml.) and dissolved by the addition of methanesulfonic acid (7.2 g., 0.075 mole). The solution is stirred and cooled to 5° C. to 10° C. A solution of sodium nitrite (2.01 g., 0.033 mole) then is added dropwise, over a period of an hour. There is an evolution of gas during the reaction, and near the end of the addition a yellow solid begins to separate. After addition is complete, the cooling bath is removed and stirring is continued for 30 minutes. The mixture is heated quickly to 50–60° C., whereby nearly all of the solid dissolves. The solution is filtered, and the filtrate is stirred and neutralized with 10 N sodium hydroxide (approximately 4.2 ml., 0.042 mole). The yellow solid that separates is removed by filtration, washed with water and dried. The yield of (3-hydroxy-6-chloropyrazinoyl)guanidine is 5.3 g. (81%), M.P. 257–259° C. (dec.).

Analysis.—Calculated for $C_6H_6ClN_5O_2$: C, 33.42; H, 2.80; N, 32.48. Found: C, 33.30; H, 3.39; N, 31.95.

By substituting for the 3-amino-6-chloropyrazinoyl guanidine of Example 98 an equimolar amount of

[3-amino-5-(2-hydroxyethyl)amino-6-chloropyrazinoyl] guanidine,
[3-amino-5-(2,2,2-trifluoroethyl)amino-6-chloropyrazinoyl]guanidine,
(3-amino-5-p-methylbenzylamino-6-chloropyrazinoyl) guanidine,
(3-amino-5-o-fluorobenzylamino-6-chloropyrazinoyl) guanidine,
(3-amino-5-furfurylamino-6-chloropyrazinoyl) guanidine,
(3-amino-5-propargylamino-6-chloropyrazinoyl) guanidine,
(3-amino-5-cyclopropylmethylamino-6-chloropyrazinoyl)guanidine, and
(3-amino-7-chloroquinoxalincarboxyl)guanidine and employing substantially the same precedure described therein, there is produced respectively

[3-hydroxy-5-(2-hydroxyethyl)amino-6-chloropyrazinoyl]guanidine,
[3-hydroxy-5-(2,2,2,-trifluoroethyl)amino-6-chloropyrazinoyl]guanidine,
(3-hydroxy-5-p-methylbenzylamino-6-chloropyrazinoyl) guanidine,
(3-hydroxy-5-o-fluorobenzylamino-6-chloropyrazinoyl) guanidine,
(3-hydroxy-5-furfurylamino-6-chloropyrazinoyl) guanidine,
(3-hydroxy-5-propargylamino-6-chloropyrazinoyl) guanidine,
(3-hydroxy-5-cyclopropylmethylamino-6-chloropyrazinoyl)guanidine, and
(3-hydroxy-7-chloroquinoxalincarbonyl)guanidine.

EXAMPLE 99

Dry filled capsule containing 50 mg. of active ingredient

|  | Mg. per capsule |
|---|---|
| (3-hydroxy-6-bromopyrazinoyl)guanidine hydrochloride | 50 |
| Lactose | 273 |
| Magnesium stearate | 2 |
| Mixed powders | 325 |

Mix the (3-hydroxy-6-bromopyrazinoyl)guanidine hydrochloride from Example 53, lactose and magnesium stearate and reduce to a No. 60 mesh powder. Encapsulate, filling 325 mg. in each No. 2 capsule.

The above formulation can be employed to prepare capsules of other novel compounds of this invention hereinbefore described.

What is claimed is:

1. A member selected from the compound of structural formula

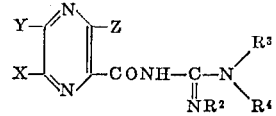

and pharmaceutically acceptable salts thereof wherein:
X is a member selected from the group consisting of
 (a) hydrogen,
 (b) halogen,
 (c) lower-alkyl,
 (d) lower cycloalkyl,
 (e) phenyl, and
 (f) halophenyl;
Y is a member selected from the group consisting of
 (a) hydrogen,
 (b) hydroxy,
 (c) lower alkoxy,
 (d) lower alkylthio,
 (e) lowr-alkyl,
 (f) ω,ω,ω-trifluorolower alkyl,
 (g) cyclolower alkyl, and
 (h) phenyl;
X and Y can be linked together to form with the pyrazine moiety a quinoxaline or tetrahydroquinoxaline compound;
R² is a member selected from the group consisting of
 (a) hydrogen, and
 (b) lower-alkyl;
R³ is a member selected from the group consisting of
 (a) hydrogen, and
 (b) lower-alkyl;
R⁴ is a member selected from the group consisting of
 (a) hydrogen,
 (b) lower-alkyl,
 (c) phenyl lower-alkyl,
 (d) napthyl lower-alkyl, (e) halophenyl lower-alkyl,
(f) lower(alkylphenyl alkyl),
(g) lower(alkoxyphenyl alkyl),
(h) heterocyclic lower-alkyl, the heterocyclic portion being selected from octahydro-1-azocinyl, and pyridyl,
(i) hydroxy lower-alkyl,
(j) phenyl,
(k) lower alkylphenyl, and
(l) halophenyl;

$R^3$ and $R^4$ when lower-alkyl groups can be linked together to form a pyrrolidinyl group;

$R^2$ and $R^3$ when lower-alkyl groups can be linked together to form a group selected from 2-imidazolinyl and 3,4,5,6-tetrahydro-2-pyrimidinyl;

Z is a member selected from the group consisting of
(a) $OR^7$, wherein $R^7$ is a member selected from the group consisting of
(1) hydrogen,
(2) lower-alkyl,
(3) phenyl lower-alkyl and
(b) $SR^8$, wherein $R^8$ is a member selected from the group consisting of
(1) hydrogen,
(2) lower-alkyl,
(3) phenyl lower-alkyl,
(4) phenyl.

2. A compound as claimed in claim 1, wherein Z is hydroxyl.

3. A compound as claimed in claim 1, wherein Z is lower alkoxy.

4. A compound as claimed in claim 1, wherein Z is phenyllower-alkoxy.

5. A compound as claimed in claim 1, wherein Z is mercapto.

6. A compound as claimed in claim 1, wherein Z is lower alkylthio.

7. A compound as claimed in claim 1, wherein Z is phenalkylthio.

8. A compound as claimed in claim 1, wherein $R^2$, $R^3$ and $R^4$ are hydrogen.

9. A compound as claimed in claim 1, wherein $R^2$, $R^3$ and $R^4$ are hydrogen, and Z is hydroxyl.

10. A compound as claimed in claim 1, wherein $R^2$, $R^3$ and $R^4$ are hydrogen, Z is hydroxyl and X is halogen.

11. (3-hydroxy-6-bromopyrazinoyl)guanidine.

12. (3-hydroxy-6-chloropyrazinoyl)guanidine.

13. (3-methoxy-6-chloropyrazinoyl)guanidine.

14. 1-(3-methoxy - 5 - methylpyrazinoyl) - 3 - (2-hydroxyethyl)guanidine.

15. (3-methoxy-6-ethylpyrazinoyl)guanidine.

16. (3-mercaptopyrazinoyl)guanidine.

17. (3-mercapto-6-chloropyrazinoyl)guanidine.

18. (3-methylmercapto-6-bromopyrazinoyl)guanidine.

19. (3-phenylmercapto-6-phenylpyrazinoyl)guanidine.

References Cited

UNITED STATES PATENTS

| 3,240,780 | 3/1966 | Cragoe et al | 260—250 |
| 3,313,813 | 4/1967 | Cragoe | 260—250 |

OTHER REFERENCES

Theilheimer: Synthetic Methods of Organic Chemistry, Basel, Vol. 9, p. 186, vol. 19, p. 197.

ALEX MAZEL, Primary Examiner

R. V. RUSH, Assistant Examiner

U.S. Cl. X.R.

424—250